May 4, 1965  KEIKI KAWASAKI  3,181,490
METHOD AND APPARATUS FOR CUTTING THREADS IN A SEWING MACHINE
Filed Oct. 2, 1962  5 Sheets-Sheet 1

INVENTOR.
Keiki Kawasaki
BY
Michael S. Striker
ATTY

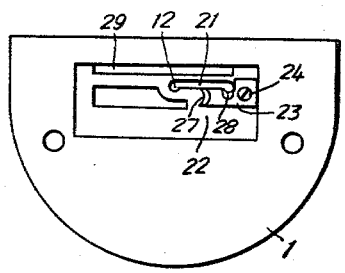
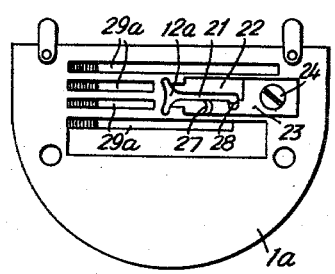
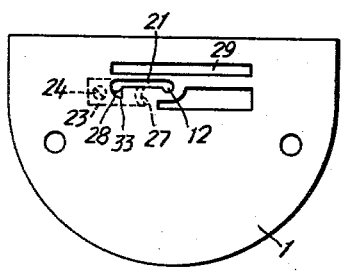
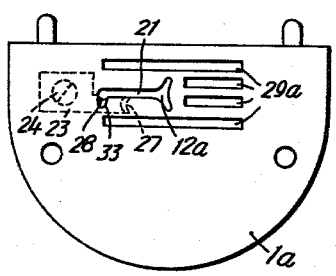
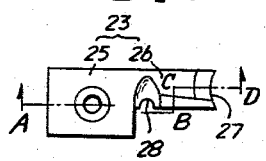
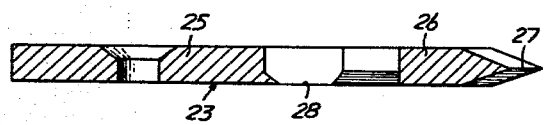
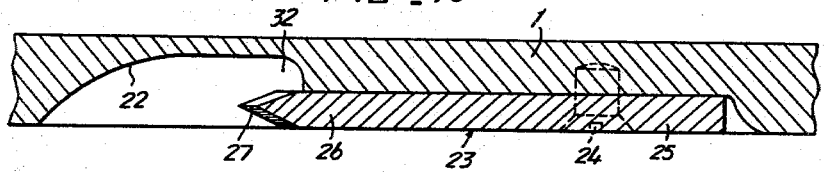

United States Patent Office 3,181,490
Patented May 4, 1965

3,181,490
METHOD AND APPARATUS FOR CUTTING THREADS IN A SEWING MACHINE
Keiki Kawasaki, Ohta-ku, Tokyo, Japan, assignor to Riccar Sewing Machine Co., Ltd., Tokyo, Japan
Filed Oct. 2, 1962, Ser. No. 227,886
Claims priority, application Japan, Oct. 2, 1961, 36/35,761; Jan. 20, 1962, 37/2,428; Sept. 13, 1962, 37/51,921
5 Claims. (Cl. 112—252)

The present invention relates to a thread cutting arrangement for a sewing machine, and more particularly to a method and apparatus for cutting one or both threads of a sewing machine by cutting means forming part of the sewing machine.

When a sewing machine is operated, stitches are formed in the material or fabric by the interconnection of an upper thread threaded in the needle, and of a lower thread operated by the shuttle. At the end of a seam, either both threads, or only the lower thread, have to be cut, and while the upper thread is comparatively accessible, the lower thread is covered by the material so that it is necessary to raise the material if the lower thread is to be severed. This operation is particularly time-consuming, if the end of the seam is located in the middle of the material, and not at an edge of the same.

According to prior art constructions, blades are operated from a cam mechanism to cut the threads. However, the known devices are very complicated, and not suitable for household operations, but only for industrial applications. Furthermore, the known constructions are expensive to manufacture, and are not easily operated by inexperienced and unskilled persons. It is one object of the present invention to overcome the disadvantages of known constructions for cutting the threads in a sewing machine and to provide an arrangement permitting an unskilled operator to cut the threads in a simple operation.

Another object of the invention is to provide an arrangement by which the threads are cut in a sewing machine in such a manner that the upper and lower threads have ends of an appropriate length permitting the forming of the next stitch without waste of thread material.

Another object of the present invention is to provide an arrangement for cutting the threads in a sewing machine by which a very economic use of the thread is achieved.

Another object of the invention is to provide in a sewing machine a cutting arrangement which does not require a special mechanism, or a substantial adaptation of existing sewing machines.

Another object of the present invention is to provide a cutting arrangement for the threads of a sewing machine which effects the cutting operation by manual shifting of the material or fabric in which the threads form a stitch or seam.

Another object of the present invention is to provide a cutting arrangement for a sewing machine in which the threads are cut off at such a length and are held in such a position, that the next following needle movement will effect the interlooping of the two cut off thread ends.

With these objects in view, the method according to the invention comprises the step of manually moving a material or fabric having therein a stitch formed of two interconnected threads from a sewing position in which the stitch is made, to a cutting position in which the stitch is located in the region of cutting means which are mounted on the table of the sewing machine. In this manner, either the lower thread or both threads are engaged by the cutting means and cut by the same.

When the needle is in the lower position, both threads are located below the needle plate of the machine, and are cut by the cutting means, which are secured to the bottom face of the needle plate. In the higher position of the needle, only the lower thread is located below the needle plate, and cut by the cutting means when the material is shifted by the operator.

In order to obtain the proper length of each cut off thread end, the threads are cut when the shuttle assumes such a turned position that the needle threads is looped about the shuttle. In this position, the needle thread and the shuttle thread extend at an angle to each other from the opening in the needle plate, and consequently can be separately severed by two spaced edges of the cutting means.

An apparatus according to the invention and according to one embodiment comprises supporting means, such as the table of the sewing machine and the needle plate and cover plate thereon, a needle reciprocable to pass with a first thread through the material and through the opening in the needle plate, shuttle means cooperating with the needle for interconnecting a second thread with a first thread to form a stitch in the material, and cutting means mounted on the supporting means, preferably on the bottom face of the needle plate, and in the proximity of the opening in the needle plate.

In the preferred embodiment, the opening is elongated, and has one end portion through which the needle passes, and another end portion where the cutting means is located. The operator shifts the material with the last stitch therein in longitudinal direction of the elongated opening, which corresponds to the reverse feeding direction, and in this manner the shuttle thread, or if the needle is in the proper position, both threads are cut by the cutting means.

In one embodiment of the invention, the cutting means is a blade having a lateral cutting edge extending in longitudinal direction of the opening in the needle plate and a second transverse edge located laterally of the elongated opening. When the thread is looped about the shuttle, it assumes an angular position crossing the transverse cutting edge, particularly due to the fact that a suitable cavity is provided in the bottom face of the needle plate which permits the thread to assume an oblique position extending from the opening in the needle plate across the transverse edge of the cutting blade.

In the preferred embodiment of the invention, a holding member in the form of a hook is secured to the bottom face of the needle plate in such a position that it catches and holds the shuttle thread so that the same is in a suitable position to be looped with the needle thread after it was cut off by the cutting means until movement of the fabric by the operator.

The novel features which are considered as characteristic for the invention are set forth in particular in the appended claims. The invention iself, however, both as to its construction and its method of operation, together with additional objects and advantages thereof, will be best understood from the following description of specific embodiments when read in connection with the accompanying drawings, in which:

FIG. 4 is a bottom view of a needle plate used in the embodiment of FIG. 1;

FIG. 5 is a top view of the needle plate shown in FIG. 4;

FIG. 6 is a bottom view of a modified needle plate as used for zig-zag sewing machines;

FIG. 7 is a top view of the needle plate illustrated in FIG. 6;

FIG. 8 is a bottom view illustrating a cutting means used in the embodiment of FIG. 1 on an enlarged scale;

FIG. 9 is a sectional view taken on line A—B—C—D in FIG. 8, but illustrating the cutting means on a larger scale;

FIG. 10 is a fragmentary sectional view taken along the blade of FIG. 4, but drawn to a larger scale;

Figure 1:
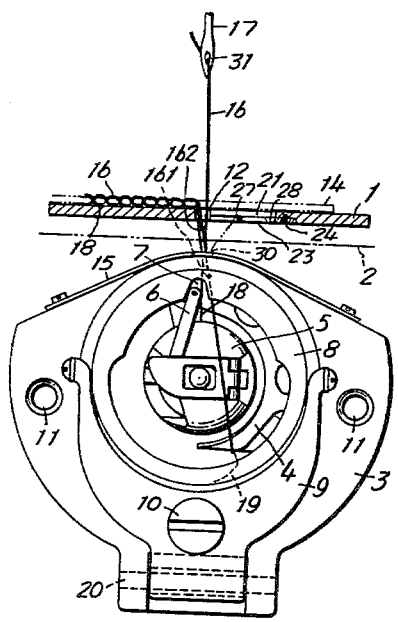
FIG. 1 is a side elevation, partially in section, illustrating one embodiment of the invention.
Figure 3:
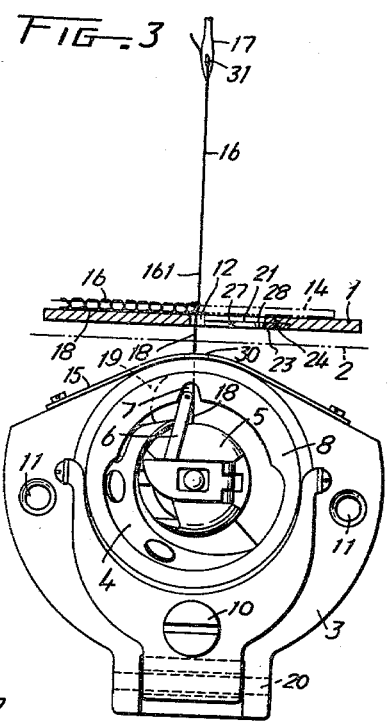
FIG. 3 is a side elevation of the same embodiment in another operational position.
Figure 2:
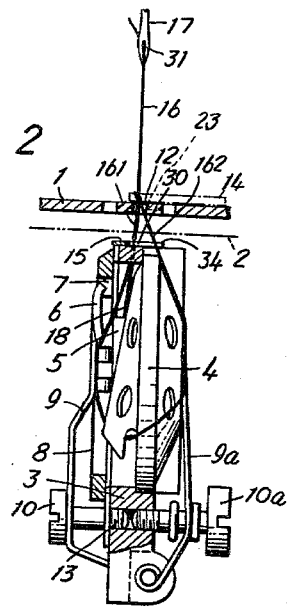
FIG. 2 is a front view of the embodiment of FIG. 1, partially in section.

Referring now to the drawings, and more particularly to FIGS. 1 to 3, the supporting table 2 of a sewing machine supports in a conventional manner the needle plate 1, which is shown in detail in FIGS. 4 and 5 for a standard sewing machine, and in FIGS. 6 and 7 for a zig-zag sewing machine.

A shuttle means is located underneath the supporting table 2, and includes a shuttle race secured to the machine by screws, not shown, passing through the holes 11. A shuttle 4 is mounted in the shuttle race 3 for angular oscillating movement, but the invention can also be applied to rotary shuttles. A bobbin case 5 is arranged in the shuttle 4 and adapted to receive a bobbin on which a thread is wound. The bobbin case finger 6 engages the shuttle race notch 7, and the bobbin case 5 is fixed in a conventional manner.

The shuttle race 3 includes a positioning means 8 for the shuttle 4.

A resilient latch member 9 is pivotally mounted on a pivot means 20 and held by a screw 10 in contact with the positioning means 8. The threaded portion 13 of screw 10 is threaded into the shuttle race 3. Corresponding members 9a and 10a are provided on the upper side of the shuttle means.

The above described arrangement is conventional, and as it is well known, a material or fabric 14 is placed on the supporting table 2 and moved by feeding means located in the slot 29, or 29a, see FIGS. 4 and 6 to transport the fabric in the feeding direction corresponding to the longitudinal extension of slots 29 or 29a. The upper thread 16 is tensioned by suitable means, not shown, and passes through the eye 31 of needle 17 which is reciprocated in vertical direction to pass with the thread 16 through the material 14 and through the portion 12 of an elongated opening 21, as best seen in FIGS. 4 and 5. In the modified needle plate shown in FIGS. 6 and 7, the portion 12a of the elongated opening 21a is sufficiently wide to permit a transverse oscillating movement of the needle for producing zig-zag stitches.

The lower thread 18 is drawn out from the bobbin case 5 and passes through the portion 12 or 12a of the opening 21 or 21a. The material is pierced by the needle 17 when the same performs a downward motion, and during the upward return stroke of needle 17, the catch 19 of shuttle 4 passes into the thread loop formed below the band-shaped part 15 which is provided with a needle receiving opening 30. After the thread loop is moved to the left as viewed in FIGS. 1 and 2 by the turning motion of the shuttle 4, the loop is tightened by the rising needle 17 and is then looped and interconnected with the lower thread 18 to form a stitch in the material 14. While in conventional sewing machines openings in the needle plate corresponding to the openings 12 and 12a are provided, the elongated openings 21 according to the present invention permit a movement of the thread with the fabric away from the stitching position underneath the needle 17. A cutting means 23, best seen in FIG. 8, includes an attaching portion 25 with an opening for a screw 24, and a blade part 26 which has a concave curved cutting edge 27, and another short curved cutting edge 28 provided in a lateral edge of the cutting blade.

As best seen in FIG. 10, the bottom face of the needle plate 1 is formed with a cavity 22, and the cutting edge 27 projects into such cavity so that a space 32 remains free above the cutting blade 23 in the cavity 22.

When the cutting means 23 is secured to the bottom face of the needle plate as shown in FIGS. 4 and 6, the transverse concave cutting edge 27 is located adjacent slot 21, while the cutting edge 28 is located along one longitudinal edge of slot 21. As best seen in FIGS. 5 and 7, this edge is formed with a cutout 33 so that the cutting edge 28 forms an extension of the longitudinal edge of slot 21, or 21a. Consequently, when a thread slides along the edge of the opening 21, it will reach the cutting edge 28 and be severed thereby.

Referring now to FIGS. 1, 2, 3 and 16, for describing the operation of the device, in the position shown in FIGS. 1 and 2, the needle has just performed the stitch and has moved during its return stroke from a position in which the eye 31 was located below the needle plate and the end portion 12 of slot 21, to a partly raised position where it was stopped by the operator. In this position of the needle 17, the catch 19 of shuttle 4 is in a position turned 60° or more out of the position located in the region of the needle receiving opening 30. Consequently, the upper thread 16 was caught by the catch 19 and the lower thread 18 was drawn out of the bobbin case 5 and threaded into the opening 12 to form a stitch in the material 14.

In this position, the upper thread 17 passes through the needle receiving part 30 and is laid in a loop around the shuttle 4. As shown in FIG. 2, the thread is held on one side by the catch 19, and passes about the other side of the shuttle 4 to the needle receiving opening 30 and through the opening 12 to the material 14. In the region of the opening 12, and below the same, the portion 162 of the upper thread 16 defines an angle of 40 to 50° with the other portion 161 of thread 16. The portion 161 extends almost vertically from the shuttle to the opening 12, while the portion 161 of thread 16 is oblique with respect to the vertical direction of the needle movement.

As a result of the oblique position of the thread portion 162, the same abuts the longitudinal edge of slot 21 or 21a along which the cutting means 23 is located. The cavity 22 permits thread portion 162 to pass to a position extending obliquely across the cutting edge 27. However, directly after the stitch, the thread portion 162 is located in the region of the end portion 12 of slot 21 so that the cutting edge 27 is spaced from the thread, and cannot cut the same during normal sewing operations.

If after the last stitch the machine is stopped in the position of FIG. 2, the operator can move the fabric in longitudinal direction of slot 21 until thread portion 162 engages the cutting edge 27 and is severed. Therethis recessed part 22. The middle parts of members 22, 24 are properly connected by screw 45 and the cutting blade 23 and the elastic plate 44 are fixed to the needle plate 1a by a fixing screw 24b. Cutting blade 23 as shown in detail in FIGURE 19 consists of an attaching part 25 and the blade 26, and a cutting edge 27 is formed at the end of the blade 26, at the same time, another cutting edge 28 is formed at its base. In the drawing, the cutting edge 28 is formed by shaving in the form of a circular arc dented from both sides of the plate-shaped blade 26, while the cutting edge 28 is formed by shaving and grinding in the same way from only one side at a right angle to the above-mentioned cutting edge 27. On the elastic plate 44, a finger-shaped projecting part 46 and a thin string-shaped projecting part 47 extend parallel with each other and a thread receiving and holding part 39 is formed curving and inclining to a proper degree (in the drawing, 10–20 degrees) from the vertical position towards the side of the projecting part 47 at the end of the projecting part 47. The projected part 42a is provided for engaging a hole in the cutting blade 25. To explain the above-mentioned thread receiving and holding part 39a in detail, a wide cut-out part 48 is formed between the comparably thin projecting part 47 and the finger-shaped projecting part 46, while a thin piece set at a right angle to the end of the projecting part 47 is bent at first at its base at 100–110 degrees to the main body of the elastic plate 44. Then the middle part of the projecting piece is bent again at 180 degrees and folded upon itself to make a thread receiving part, and the end of this projecting piece is suitably bent in the opposite direction to serve a thread guiding function, whereby the thread is supported in a suitable tension by the above-mentioned twofold part.

Figure 17:
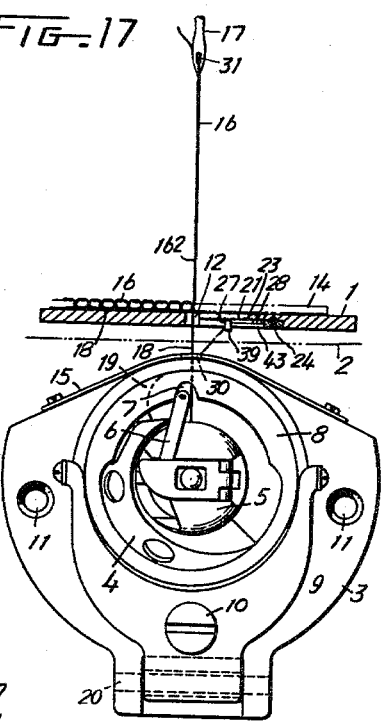
FIG. 17 is a side view illustrating the embodiment of FIG. 15 in another operational position.

Next, to explain the function of the thread receiving part 39a in such mechanism, pull the sewing cloth 14 along the guide channel 21 in the above-mentioned cutting operation and the thread 18 drawn out of the bobbin frame 5 is put in the inclined position shown in FIGURE 17. When the thread is inclined in this way, as mentioned above, the cutting edge 27 and the thread receiving part 39a formed on one side of the fixed elastic plate 44 are situated below the above-mentioned guide channel 21 so that the thread is automatically inserted into thread receiving part 39 supporting it in a suitable tensioned condition by the twofold thread receiving part 39a very smoothly because thread receiving part 39a is somewhat inclined. Held in this way, the thread is cut as mentioned above. As the thread receiving part 39a is situated at the end of the thin string-shaped projecting part 47, it has a desirable resiliency too, thus matching the tension of the held thread, and does not cut nor damage the shuttle thread. The shuttle thread 18, 161 cut in this way is kept in an inclined position by the thread receiving part 39a even after cut. Even if the shuttle thread is comparatively thin or soft, the thread cannot change its position after the cut and be markedly transformed by a twist so that it can be easily connected with the needle thread at the start of the following sewing operation.

The invention has been described with reference to a reciprocating shuttle, but those skilled in the art will understand that a rotary shuttle can also be used with the arrangement of the present invention. From the above description of preferred embodiments of the invention, it will become apparent that the device of the present invention obtains the cutting of the upper and lower threads close to the stitch in the fabric, while the cut off ends of the upper and lower thread have just the necessary length for forming the next stitch. Consequently, waste of thread is avoided, so that the device pays for itself by the savings of thread obtained thereby. Furthermore, since the lower thread is cut off without raising the material from the table, the operator saves time, particularly since the next following sewing operation can immediately be started without drawing out the thread ends to the necessary length. Conventional sewing machines can be easily adapted to be fitted with the device, since the cutting means can be attached to the needle plate, or a needle plate with an attached cutting means substituted for the conventional needle plate.

It will be understood that each of the elements described above, or two or more together, may also find a useful application in other types of thread cutting arrangements for sewing machines differing from the types described above.

While the invention has been illustrated and described as embodied in a thread cutting device attached to the needle plate of the sewing machine and operated by shifting of the material after the last stitch, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a sewing machine, in combination, a supporting table for a material and having an elongated opening adapted to extend in the feeding direction of the material and being bounded by two lateral longitudinal edges; a needle reciprocable to pass with a first thread through the material and through one end of said opening; shuttle means cooperating with said needle for interconnecting a second thread with the first thread, said shuttle means including loop-forming means for forming a loop in which said first thread extends at an angle to said second thread; and cutting means mounted on the underside of said supporting table and including a first cutting edge extending transversely to one of said edges laterally of said opening and being located spaced from said one end of said opening, and a second cutting edge forming part of said one edge and being located farther spaced from said one end than said first cutting edge so that one of said threads is first cut by said first cutting edge and then the other thread is cut by said second cutting edge when the material is manually moved away from said one end toward the other end of said opening.

2. In a sewing machine, in combination, a supporting table for a material and having an elongated opening adapted to extend in the feeding direction of the material and being bounded by two lateral longitudinal edges, one of said edges having a cutout at the other end of said opening; a needle reciprocable to pass with a first thread through the material and through one end of said opening; shuttle means cooperating with said needle for interconnecting a second thread with the first thread, said shuttle means including loop-forming means for forming a loop in which said first thread extends at an angle to said second thread; and cutting means mounted on the underside of said supporting table and including a first cutting edge extending transversely to one of said edges laterally of said opening and being located spaced from said one end of said opening, and a second cutting edge being located in said cutout forming a continuation of said one edge and being located farther spaced from said one end than said first cutting edge so that one of said threads is first cut by said first cutting edge and then the other thread is cut by said second cutting edge when the material is manually moved away from said one end toward the other end of said opening.

3. In a sewing machine, in combination, a supporting table for a material; a cover plate disposed on said supporting table and having an elongated opening adapted upon, the lower thread 18 is engaged by the second cutting edge 28 and the end of the slot 21, and is cut off so that the upper thread and lower thread are almost simultaneously cut during the slight shifting movement of the material.

The cutting of the thread takes place even if the entire needle plate and a great part of the supporting table 2 are covered by the material, which is the case when the last stitch of the same was made at a distance from the edges of the material. However, even if the edge of the material is no longer located underneath the needle, the upper thread 16 can still be caught by the catch 19 of the shuttle, and be cut in the same way as described above, or both ends 161 and 162 can be cut by the cutting edge 28.

In certain sewing operations, it is desired that only the lower thread is cut. If this is desired, the operator stops the machine when the needle is in the upper end position shown in FIG. 3. In this position, all the upper thread 16 is located above the needle plate 1 and has formed a stitch in the material 14. Only the lower thread 18 is located at the level of the cutting means 23, and when the material is shifted in the direction of the elongated opening 21, only the lower thread 18 passes along the edge of opening 21 and is engaged by the cutting edge 28 and cut. The above described cutting operations are not only accomplished in a very simple and efficient manner, but leave thread ends of just the necessary length for forming the next stitch. The upper thread 16 is cut off at the end of a loop which is made about the shuttle, so that the cut off thread end has a considerable length, for example about four inches which hang down under the opening 12. Consequently, when the needle is raised to the uppermost position, the upper thread is not drawn out of the needle eye 31, and the next stitch can be immediately formed. On the other hand, the upper thread is cut directly adjacent the surface of the material 14, so that it is not necessary to use scissors for trimming the end of the thread projecting from the material and from the last stitch.

The lower thread, however, was cut off at such a distance from the bobbin case that about 1½ to 2 inches are left whereby the lower thread end is sufficiently long for the next stitch forming operation. The length of the thread end of the lower thread projecting from the material is about the same as the length of the corresponding end of the upper thread, and may be a sixteenth of an inch. Consequently, it is not necessary to trim the end of the lower thread projecting from the material. In cutting of the threads to exactly the desired length of the thread ends, any waste of thread is entirely avoided, which is of considerable importance for sewing machine operations in the garment industry. So little thread is wasted when the device of the present invention is used, that the savings on threads during a single day will pay for the device of the present invention.

Figure 11:
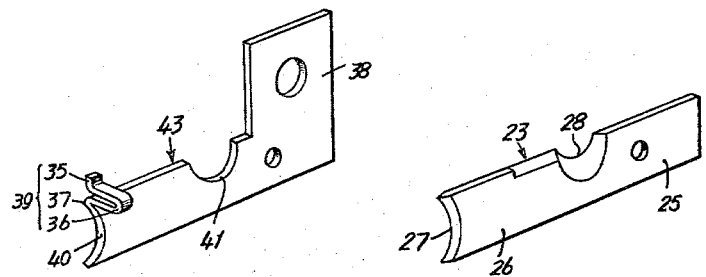
FIG. 11 is a perspective developed view showing two parts of the combined cutting and holding means shown in FIG. 12.
Figure 12:
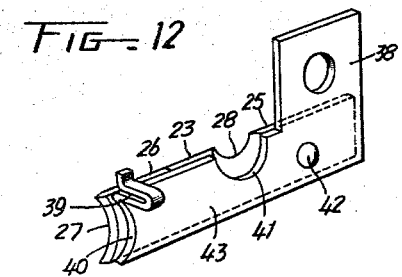
FIG. 12 is a perspective view showing a combined cutting and holding means used in a modified embodiment of the invention.
Figure 13:
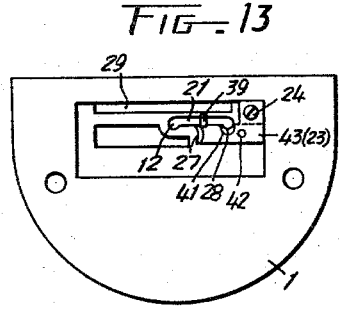
FIG. 13 is a bottom view of the needle plate provided with the combined cutting and holding means of FIG. 12.
Figure 14:
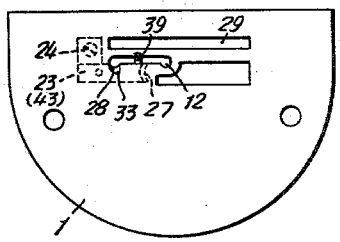
FIG. 14 is a top view of the needle plate shown in FIG. 13.
Figure 15:
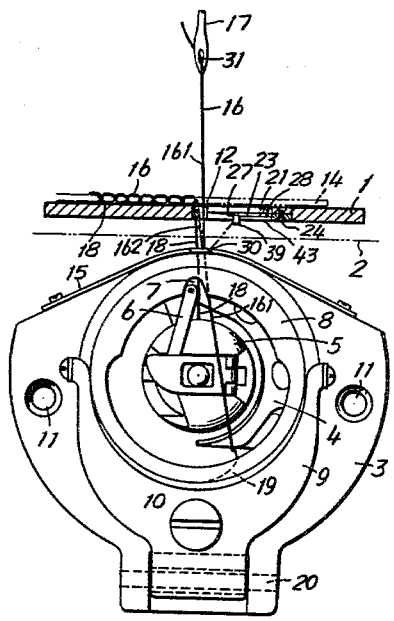
FIG. 15 is a side elevation showing an apparatus according to another embodiment of the invention provided with the combined cutting and holding means of FIG. 12.
Figure 16:
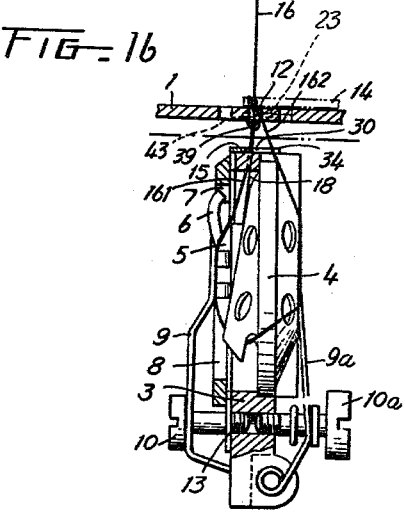
FIG. 16 is a front view of the embodiment shown in FIG. 15.

The modified embodiment illustrated in FIGS. 15 to 17 is similar to the embodiment described with reference to FIGS. 1 to 3, but includes, in addition, a holding means for the lower thread which is best seen in FIGS. 11 to 14. The needle plate 1 has a slot 29 and an opening 21, as well as a cavity 22 as described with reference to FIGS. 4 to 10. However, the supporting portion 25' of the cutting means 23' is narrow and forms a rectangular outline with the blade portion 26', as best seen in FIG. 11. The cutting means 23' is secured to a holding means 43 by a screw passing through an opening 42. Holding means 43 has a supporting or attaching portion 38, with an opening 48' through which a screw 24 passes by which holding means 43, and thereby cutting means 23', is attached to cover plate 1. The front edge 40 of the holding means 43 is curved and concave and somewhat set back from the cutting edge 27. A recess 41 is placed in a position corresponding to the cutting edge 28, and also set back from the same so that the cutting edges 27 and 28 can be engaged by threads without interference by the holding means 43. A hook-shaped holding part 36 is mounted at the front edge 40, and includes two parts folded upon each other and forming a slit 39 which is adapted to receive and clamp a thread. A laterally projecting guide portion 35 helps to guide the thread into slit 39. Corresponding to the modification of the needle plate shown in FIGS. 6 and 7, a transverse elongated extension of the portion 12 may be provided in zig-zag sewing machines permitting the needle to perform an oscillating movement.

The operation of the device shown in FIGS. 15 to 16 corresponds substantially to the operation of the embodiment of FIGS. 1 to 3. When the catch 19 of the shuttle is in a position turned 60° with respect to the opening 12, as shown in FIGS. 15 and 16, the upper thread 16 is looped about the shuttle to form the thread portion 162 and a thread portion 161 which extend at an angle to each other and meet in the material after passing through the opening 12. When the material 14 is pulled by the operator to the right as viewed in FIG. 15, the oblique thread portion 162 will be engaged by the cutting edge 27 and cut. The thread portion 161 will move in slot 21 without being cut.

When only the lower thread 18 is to be cut, the machine is started in the position in which the needle 17 is raised as shown in FIG. 17 so that only the lower thread 18 is located at the level of the cutting means 23', while the catch 19 is located near the opening 30 of part 15 of shuttle race 3. When the material 14 is moved in the direction of the elongated opening 21, the lower thread 18 is cut by engagement with the cutting edge 28, the recess 41 preventing blocking of thread 18 by the plate 43. Since thread 18 is displaced by this movement, it assumes a position corresponding to the dash and dot line shown in FIG. 17 to lead to the holding part 39. Consequently, the lower thread 18 is inserted into the slit 39 of the holding part 36 and clamped therein due to a resiliency of the two superimposed portions of the hook-shaped holding part. Thereupon, thread 18 is cut by the cutting edge 28 above the clamp thread portion, so that the part of thread 18 connected to the shuttle is held and clamped by the holding means 36, 39.

While in the embodiments of FIGS. 1 to 3, the lower thread may curl when cut off so that it is difficult to interconnect the lower thread to the upper thread during the next following needle stroke, the clamped thread end of the embodiment of FIGS. 15 and 16 will hold the cut off end portion of the lower thread 18 in such a position that an interconnection and looping of the upper and lower threads will be safely obtained during the next needle stroke.

When the needle 17 is lowered through the opening 12 and the needle receiving opening 30, it forms a loop which is caught by the catch 19 of the shuttle so that a loop extends about the shuttle when the same turns in opposite direction during the reciprocation thereof. The upper thread 16 and the lower thread 18 are safely interconnected, and by tightening of the upper thread, the cut off end of the lower thread held by the holding part 36, 39 is drawn out from the bobbin case.

The holding part 36, 39 also serves to hold the lower thread in the proper position for cutting by the cutting edge 28. In the disclosed embodiments, the cutting means is a separate element which is attached to the needle plate. It is also possible to weld the cutting plate directly to the needle plate or form the needle plate in such a manner as to include cutting edges corresponding to the above described cutting edges 27 and 28 of the cutting means 23.

Figure 19:
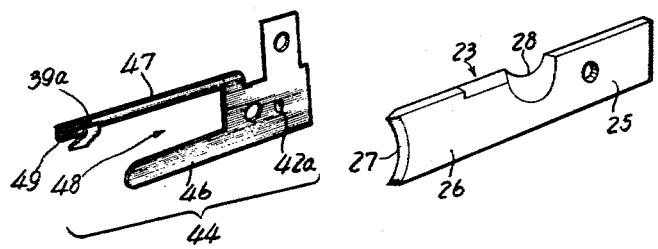
FIG. 19 is a perspective developed view showing two parts of the combined cutting and holding means according to another embodiment.
Figure 20:
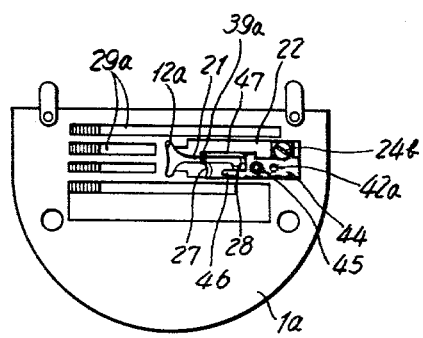
FIG. 20 is a bottom view of a modified needle plate with the cutting and holding means of FIG. 19 attached.
Figure 18:
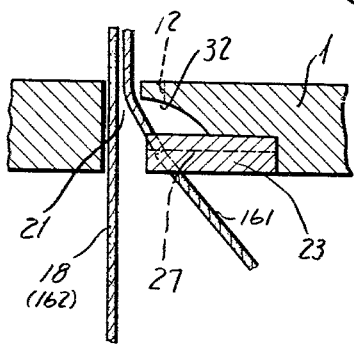
FIG. 18 is a sectional view showing a detail of FIG. 2 on an enlarged scale.

In FIGURE 19 and FIGURE 20, a guide channel 21 as illustrated is formed in a needle plate 1 and connected to the needle hole 12a extending in the same direction as the cut part of a feeder hole 29, while around the guide channel 21, a recessed part 22 is formed on the rear face and an elastic plate 44 is put on the cutting blade 23 at to extend in the feeding direction of the material and being bounded by two lateral longitudinal edges, said cover plate having in its bottom face a cavity located spaced from one end of said opening adjacent said opening; a needle reciprocable to pass with a first thread through the material and through said one end of said opening; shuttle means cooperating with said needle for interconnecting a second thread with said first thread and including loop-forming means for forming a loop in which said first thread extends at an angle to said second thread; and a cutting plate secured to the underside of said cover plate and including a first concave cutting edge extending transversely to one of said edges laterally of said opening and in the region of said cavity spaced from one end of said opening, and a second concave cutting edge forming part of said one edge and being located farther spaced from said one end than said first cutting edge, said cutting edges being disposed in relation to said shuttle means so as to be located in the path of movement of said first and second threads, respectively, when said material with said angularly spaced threads is manually moved away from said one end of said opening toward the other end of said opening whereby said threads are successively cut.

4. An apparatus as set forth in claim 3 wherein said cutting plate includes a holding means located in the region of said one edge and having a slit for clamping said second thread.

5. The method of cutting the upper and lower threads in a sewing machine, comprising the steps of placing the threads in a positon in which they are angularly displaced and have portions transversely spaced from each other below the sewing plane of the machine; moving a material having a stitch formed of said upper and lower threads to a position in which said portions of said angularly displaced threads engage successively a pair of transversely and longitudinally spaced cutting edges whereby said threads are cut.

References Cited by the Examiner
UNITED STATES PATENTS

| | | | |
|---|---|---|---|
| 52,398 | 2/66 | Dennis et al. | 112—252 |
| 757,463 | 4/04 | Hogan | 112—252.5 |
| 840,887 | 1/07 | Wood | 112—252.5 X |
| 1,813,374 | 7/31 | Woolsey | 112—252.5 |
| 1,883,746 | 10/32 | H'Doubler | 112—252.5 |
| 2,261,680 | 11/41 | Hale | 112—252.5 |

JORDAN FRANKLIN, *Primary Examiner.*
DAVID J. WILLIAMOWSKY, *Examiner.*